US009938859B2

(12) United States Patent
Nolfi et al.

(10) Patent No.: US 9,938,859 B2
(45) Date of Patent: Apr. 10, 2018

(54) INTEGRAL, ENCLOSED FOREIGN MATERIAL EXCLUSION DEVICE

(71) Applicant: Advanced F.M.E. Products, Inc., Mentor, OH (US)

(72) Inventors: Thomas J. Nolfi, Chardon, OH (US); Mario M. Nolfi, Willoughby, OH (US)

(73) Assignee: ADVANCED F.M.E. PRODUCTS, INC., Mentor, OH (US)

(*) Notice: Subject to any disclaimer, the term of this patent is extended or adjusted under 35 U.S.C. 154(b) by 126 days.

(21) Appl. No.: 14/017,726

(22) Filed: Sep. 4, 2013

(65) Prior Publication Data

US 2015/0060451 A1 Mar. 5, 2015

(51) Int. Cl.

| | |
|---|---|
| ***B65D 59/02*** | (2006.01) |
| ***B65D 43/16*** | (2006.01) |
| ***B08B 9/02*** | (2006.01) |
| ***B08B 9/04*** | (2006.01) |
| ***B08B 9/043*** | (2006.01) |
| ***B08B 9/055*** | (2006.01) |
| ***F16L 55/132*** | (2006.01) |
| ***F16L 55/128*** | (2006.01) |
| ***F16L 55/26*** | (2006.01) |
| ***F01D 25/28*** | (2006.01) |

(52) U.S. Cl.
CPC ........ *F01D 25/285* (2013.01); *F05D 2230/60* (2013.01)

(58) Field of Classification Search
CPC .. B65D 59/02; B65D 43/16; B65D 2588/165; B08B 9/02; B08B 9/04; B08B 9/043; B08B 9/055; B08B 9/0553; F16L 55/132; F16L 55/1283; F16L 55/26
USPC .................................. 220/260, 375; 215/235
See application file for complete search history.

(56) References Cited

U.S. PATENT DOCUMENTS

| | | | | | |
|---|---|---|---|---|---|
| 1,493,501 | A | * | 5/1924 | Rice | 215/364 |
| 1,760,750 | A | * | 5/1930 | Goodman | F16K 7/10 138/93 |
| 2,245,887 | A | * | 6/1941 | Wikander | 4/295 |
| 2,367,480 | A | * | 1/1945 | Beswick | F16B 39/36 279/7 |
| 3,277,508 | A | * | 10/1966 | Knapp | B08B 9/0553 15/104.001 |
| 3,618,809 | A | * | 11/1971 | Martino | 220/235 |
| 4,060,100 | A | * | 11/1977 | Miller et al. | 138/89 |
| 4,069,852 | A | * | 1/1978 | Lofberg | B65D 88/1637 383/16 |
| 4,328,904 | A | * | 5/1982 | Iverson | 220/229 |
| 4,437,577 | A | * | 3/1984 | Myers | B65D 88/46 220/218 |
| 4,549,580 | A | * | 10/1985 | Freeman | F16L 55/136 138/89 |

(Continued)

*Primary Examiner* — Andrew T Kirsch

(74) *Attorney, Agent, or Firm* — Hudak, Shunk & Farine Co. LPA

(57) ABSTRACT

Foreign material exclusion devices adapted to be positioned in a construction, for example a tube or pipe to temporarily seal off one side of the construction from another. The device includes a resilient body surrounded by an enclosure that substantially conforms to the shape of the body. At least one internal support component aids in connecting the enclosure to the body and provided reliable, consistent alignment between the body and enclosure.

15 Claims, 5 Drawing Sheets

(56) References Cited

U.S. PATENT DOCUMENTS

| | | | | | |
|---|---|---|---|---|---|
| 4,762,151 | A | * | 8/1988 | Kinnan | F16L 55/132 138/89 |
| 4,871,597 | A | * | 10/1989 | Hobson | 428/36.1 |
| 4,964,438 | A | * | 10/1990 | Welty | 138/89 |
| 5,297,691 | A | * | 3/1994 | Bottcher | F16L 55/132 138/89 |
| 5,623,971 | A | * | 4/1997 | Foernzler | 138/89 |
| 5,735,425 | A | * | 4/1998 | Beadle | 220/235 |
| 5,904,965 | A | * | 5/1999 | Noel et al. | 428/36.5 |
| 5,927,000 | A | * | 7/1999 | Bordes, Jr. | 43/124 |
| 6,032,515 | A | * | 3/2000 | Huber | 73/49.1 |
| 6,105,618 | A | * | 8/2000 | Blaney | 138/89 |
| 6,170,529 | B1 | * | 1/2001 | Howe | 138/89 |
| 6,227,132 | B1 | * | 5/2001 | Garcia | 114/197 |
| 6,360,779 | B1 | * | 3/2002 | Wagner et al. | 138/92 |
| 6,419,104 | B1 | * | 7/2002 | Sarajian | 220/234 |
| 6,453,603 | B1 | * | 9/2002 | Baker | 43/124 |
| 6,506,014 | B1 | | 1/2003 | Nolfi et al. | |
| 6,662,490 | B1 | * | 12/2003 | Aesch, Jr. | 43/124 |
| 6,796,449 | B2 | * | 9/2004 | Fragola | 215/364 |
| 6,824,356 | B2 | | 11/2004 | Nolfi et al. | |
| 7,533,698 | B2 | | 5/2009 | Nolfi et al. | |
| 8,776,949 | B2 | * | 7/2014 | Oswalt | 182/129 |
| 2005/0279010 | A1 | * | 12/2005 | Krog | 43/44.87 |
| 2009/0314787 | A1 | * | 12/2009 | Reusche et al. | 220/694 |

* cited by examiner

INTEGRAL, ENCLOSED FOREIGN MATERIAL EXCLUSION DEVICE

FIELD OF THE INVENTION

The present invention relates to foreign material exclusion devices adapted to be positioned in a construction, for example a tube or pipe to temporarily seal off one side of the construction from another. In one embodiment, the device includes a resilient body surrounded by an enclosure that substantially conforms to the shape of the body. At least one internal support component aids in connecting the enclosure to the body and provided reliable, consistent alignment between the body and enclosure.

BACKGROUND OF THE INVENTION

During assembly or maintenance of various assemblies or constructions in various industries, it is desirable to prevent the introduction of debris into one or more areas to prevent damage to various objects or prevent safety hazards. Foreign material exclusion is of particular concern in the field of power generation and supply, whether nuclear, hydro or fossil fueled in order to prevent or reduce power shortages and outages, as well as increase nuclear safety.

While undergoing maintenance or assembly, small parts, screws, bolts, or other foreign objects can fall into crevices and openings. If not prevented, retrieved or noticed, such parts can have the potential to destroy or at least damage a particular unit and produce varying consequences, potentially catastrophic.

U.S. Pat. No. 6,506,014 relates to a device which can be utilized to temporarily seal substantially any opening on a turbine which is being assembled or repaired. The foreign material exclusion device advantageously maintains fail-safe integrity of desired portions of a turbine. Protection of the sensitive areas of a turbine prevents possible hazardous malfunctions or explosions of a turbine. The foreign material exclusion device is substantially elastic or resilient and can be compressed to fit into a desired opening and can be re-expanded to provide a snug fit about an opening.

U.S. Pat. No. 6,824,356 relates to a device which can be utilized to temporarily seal substantially any opening on a turbine which is being assembled or repaired. The foreign material exclusion device includes a main body, preferably formed from a foamed polymer or rubber. The foreign material exclusion device is substantially elastic or resilient and can be compressed to fit into a desired opening and can be re-expanded to provide a snug fit about an opening. An extraction member is connected to the main body and is preferably utilized to remove the device from a portion of a cavity of a turbine.

U.S. Pat. No. 7,533,698 relates to a foreign material exclusion device which is adapted to be utilized in tubes, pipes, or the like to prevent entry of debris into a potentially sensitive area of an assembly, such as a turbine assembly utilized in a power plant. In one embodiment, the device is adapted to be connected to a non-moving portion of a rotary milling tool, such as the collet, before a milling operation to prevent milling debris from entering a sensitive portion of a tube or pipe. In a further embodiment, each device of the invention includes a unique identifier or identification element, such as a machine readable bar code or RFID (radio frequency identification) tag, to insure all devices utilized for a particular job are accounted for.

Inflatable pipe plugs are also known in the art, wherein the plug includes an inflatable/deflatable bladder including one or more gas inlets and/or outlets. The plugs are generally inserted into a construction in a deflated or semi-inflated state at a desired location and then inflated to form a seal until after a desired operation is performed on the construction.

Still other tube plugs are known in the art that have a resilient body located within a cover, wherein the outer surface of the cover or an outer part of the cover can be connected to a device such as a rope or line that can be used to pull the tube plug from a construction, generally after the tube plug completes its function.

SUMMARY OF THE INVENTION

Against this background to would be desirable to provide an integral, enclosed foreign material exclusion device that can be reliably aligned in a construction an also maintained as a unitary construction free from loss of parts thereof.

A problem of the invention is solved by providing a foreign material exclusion device having an enclosure that is conformable to a shape of a body, wherein the enclosure encases and is interconnected to a resilient body and prevents pieces of the body from being separated from the device.

Another object of the invention is to provide a device including a resilient body and an enclosure with an internal support device that maintains a desired alignment between the components thus facilitating reliable insertion and removal of the device from a construction.

Yet another object of the invention is to provide a device having an enclosure that can be removed or separated from the device to allow for cleaning, for example to remove debris such as radiological debris.

Still another object of the present invention is to provide the enclosure with a connector segment, preferably in the form of a loop in one embodiment, on a lower interior surface, that can be connected to a retrieval aid which can be extended through an internal support device extending through at least a portion of the body and out of the enclosure.

A further object of the present invention is to provide an enclosure having a plurality of flaps, in particular three or more flaps preferably on an upper surface of the enclosure that can be folded such that they overlap one another in at least one area in order to encase the body within the enclosure and also to prevent debris from entering the enclosure.

BRIEF DESCRIPTION OF THE DRAWINGS

The invention will be better understood and other features and advantages will become apparent by reading the detailed description of the invention, taken together with the drawings, wherein.

DETAILED DESCRIPTION OF THE INVENTION

Figure 1:
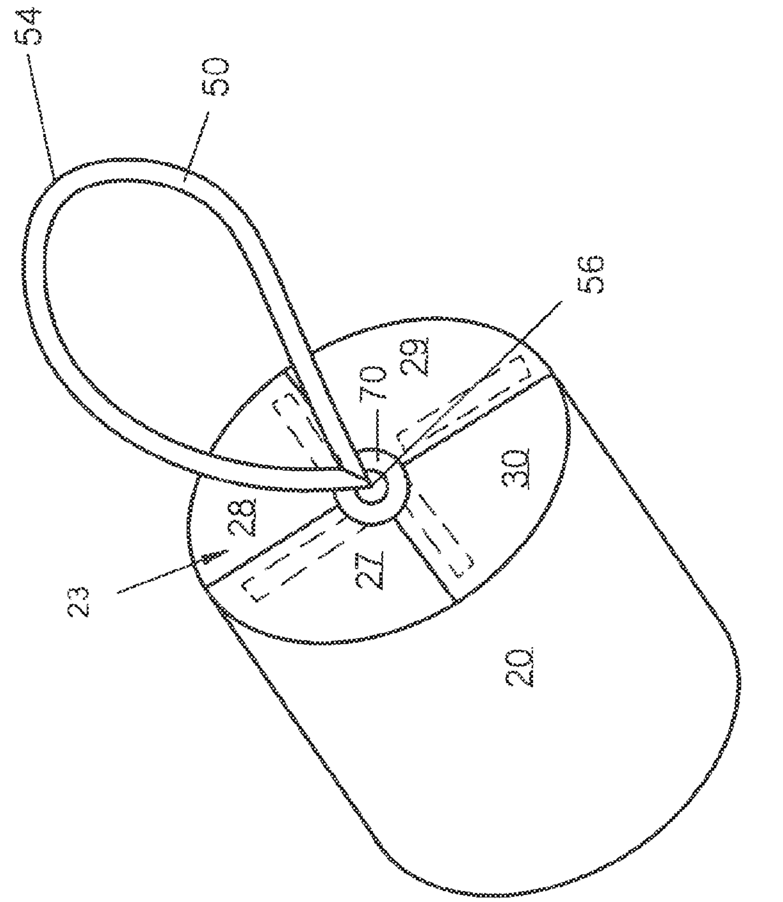
FIG. 1 illustrates a perspective view of one embodiment of an integral, enclosed foreign material exclusion device.

This description of preferred embodiments is to be read in connection with the accompanying drawings, which are part of the entire written description of this invention. In the description, corresponding reference numbers are used throughout to identify the same or functionally similar elements. Relative terms such as "horizontal," "vertical," "up," "upper", "down," "lower", "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and are not intended to require a particular orientation unless specifically stated as such. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship.

The foreign material exclusion devices of the present invention are especially adapted to be temporarily positioned in a construction, for example, but not limited to, a tube, a pipe, an orifice, a cavity, or the like to seal off a potentially sensitive area of the construction from foreign materials, debris or the like. As an example, it is desirable to protect a construction such as a turbine and a power plant from debris as the turbine can be catastrophically damaged by parts, metal shavings or the like. Foreign material exclusion devices can be utilized during construction, assembly, repair or the like of a portion of a product such as, but not limited to, a turbine, a pump, a fan, a housing, a boiler tube, an engine or any other device with limited access openings and/or cavities.

Figure 2:
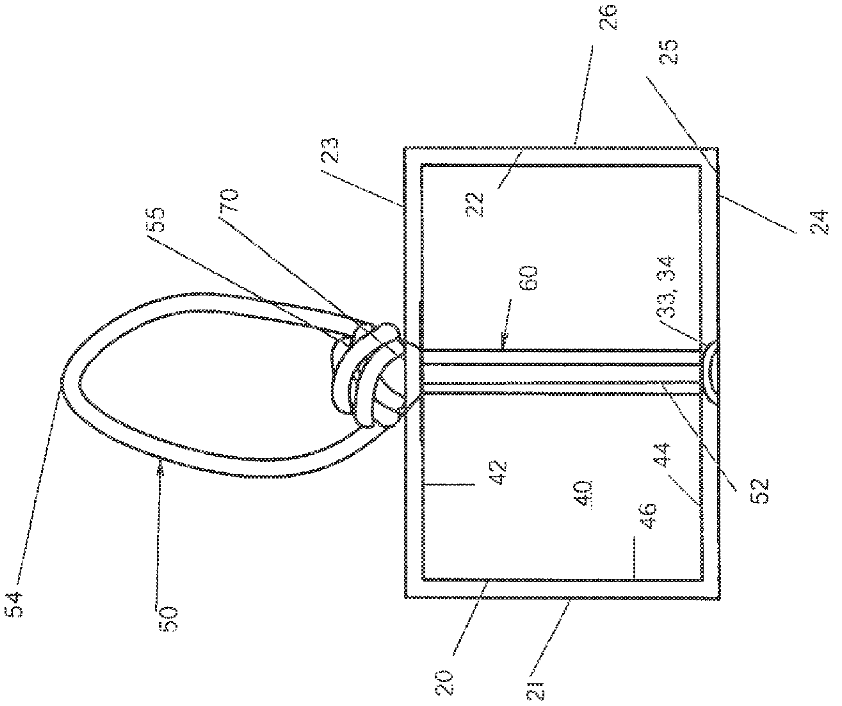
FIG. 2 is a cross-sectional side view of one embodiment of a device of the present invention.

Referring now to the drawings, wherein like parts or components represent like or identical reference numbers throughout the several views, FIG. 1 illustrates one embodiment of an integral, enclosed foreign material exclusion device 10 that includes an enclosure 20 that surrounds a body 40 as illustrated in FIG. 2, wherein a retrieval aid 50 extends outwardly from the enclosure 20.

As disclosed within various figures of the invention, enclosure 20 is formed of a conformable material and is adapted to house a desired body 40. The enclosure generally is defined by an outer surface 21, an inner surface 22, an upper surface 23, a lower surface 24, a lower interior surface 25 and one or more sides 26.

Enclosure 20 is formed from a durable material which can be man-made, i.e. synthetic or a natural material, or a combination thereof. Synthetic materials are preferred in one embodiment. The enclosure can be a woven or non-woven material and include one or more or two or more layers.

When it is desired to utilize an enclosure that is one or more of flame resistant and heat resistant, one or more layers can be utilized. When two or more layers are utilized, a flame resistant or heat resistant layer is present on the outer surface 21 of enclosure 20.

Materials utilized can be inherently flame resistant materials, that are resistant to heat and flame due to their chemical structure. For example, materials in the form of fibers are available from Dupont as Kevlar® and Nomex® which comprise inherently heat and flame resistant fibers and the actual structure of the fiber is not flammable. Thus, heat and flame protection is built into the fiber or material per se, which cannot be worn away or washed out and are thus preferred in one embodiment of the present invention. That said, heat or flame resistant treated fabrics or materials can also be utilized. These materials are made heat and/or flame resistant by the application of a flame-retardant chemical or compound to the material in order to provide a desired level of flame retardancy.

That said, suitable materials for use in forming one or more layers, in whole or in part, of the enclosure include, but are not limited to, treated natural fibers, for example including but not limited to cotton, jute, hemp, and flax; wool; aramid-type polymers, polyhydroquinone-diimidazopyridine; and coated nylons or combinations thereof. Suitable heat resistant and fire-resistant materials are known in the art and available as Arselon®, Kevlar®, Modacrylic®, M5® fiber, Nomex® I, II and/or III, PBI® and Pyrovatex®.

In one embodiment, at least one layer of the enclosure includes Nomex®3 which is generally a blend of Nomex®, Kevlar® and one or more anti-static fibers.

In a further embodiment, the laminate is formed from a material that can be washed, for example one or more by hand and in a washing machine such as an industrial washing machine. Washing can be useful in order to remove debris, for example radiological debris.

In one embodiment, suitable materials for at least the enclosure, and in some embodiments also the other components of the device, for example the body and/or retrieval aid, are selected to have relatively low halogen content, for example below 1,000 ppm, below 500 ppm, and preferably below 350 ppm. Halogen-containing materials are commonly used for flame resistance but can penetrate protective, passivated coatings on stainless steels and induce corrosion. Thus, the use of low halogen-containing materials in the device of the present invention are desired when the device will be in contact with stainless steel components.

In one important aspect of the present invention, the enclosure 20 is provided with a connector segment 33, preferably in the form of an eyelet or loop 34 that is connected or attached to a desired surface of the enclosure, such as the lower interior surface 25 as illustrated in FIG. 2. The function of the connector segment 33 is to allow a selectively removable connection to a retrieval aid 50. The connector segment 33 can be fixedly connected to the enclosure by any suitable method such as sewing, an adhesive, knotting or the like.

In various embodiments, the enclosure 20 is fabricated to allow insertion and removal from a construction having particular dimensions. Moreover, as body 40 is housed within the enclosure 20, the latter must also generally conform to the dimensions of the body. Depending on the type of material utilized to form the enclosure, the fabrication thereof can vary. Thus, in one embodiment the enclosure is formed from a plurality of panels, in particular by sewing, adhering, or otherwise connecting the desired materials to form the enclosure having suitable dimensions.

In order to allow the body 40 to be placed within the enclosure, in a preferred embodiment the upper surface 23 is provided with an aperture 32 through which the body is inserted into the enclosure.

Figure 3:
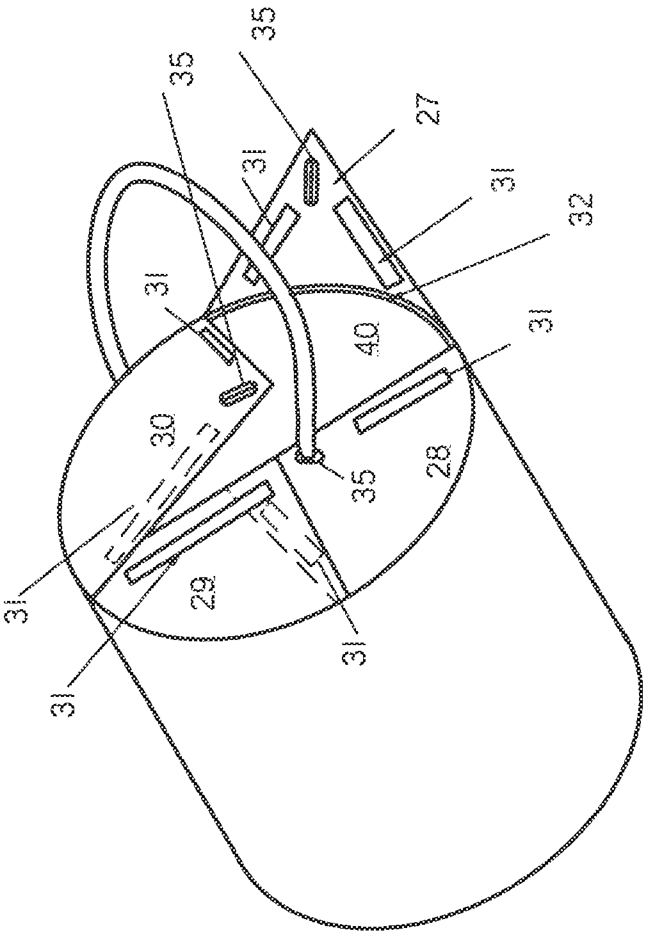
FIG. 3 is a perspective view particularly illustrating the upper surface of an enclosure of the device illustrating a retrieval aid being extended through an aperture in a flap of the enclosure.

In order to accommodate body 40 within an enclosure 20 and further to prevent debris from entering the interior of the enclosure, the enclosure is provided with at least two flaps and preferably three, four or more flaps that can be operatively connected to facilitate sealing of the enclosure, with the body inside of the enclosure. The upper surface 23, in particular two or more flaps thereof, are provided with a fastener assembly 31 that provides a resealable connection between two or more flaps. For example, as illustrated in FIG. 3, the fastener assembly 31 comprises a Velcro® connector having a first fastener and a second fastener located on different flaps. As illustrated in FIG. 3, a first portion of a fastener assembly 31 is connected to first flap 27 and a second portion of fastener assembly 31 is connected to second flap 28. The second flap is also illustrated being connected to third flap 29 utilizing a fastener assembly 31. Another fastener assembly 31 is also partially illustrated which is in position to connect third flap 29 and fourth flap 30. In the embodiment illustrated in FIG. 3, each flap is provided with a flap aperture 35 through which retrieval aid 50 extends. Accordingly, as illustrated in FIG. 1 when adjacent flaps are connected by fastener assemblies, the upper surface 23 of enclosure 20 is sealed against intrusion of debris.

The composition of body 40 of the exclusion device is generally a resilient material, preferably a polymer, a rubber, or a polymer or rubber foam. It is important that body 40 is elastic or resilient in nature so that it can be compressed to fit into a desired opening, and yet re-expand to provide a snug fit within or about the opening. The resiliency of body 40 allows the foreign material exclusion device to hold itself in place in a predetermined location or orifice.

The actual size dimensions, i.e. the length, width, and thickness of body 40 of foreign material exclusion devices 10 of the present invention will vary depending on the size and shape of the orifice, tube, opening, etc. which is to be protected or isolated. That is, body 40 of foreign material exclusion device 10 is not limited to one specific geometric or random shape or size such as a cylinder, cube, block, or the like, but is custom tailored or profile fit to the dimensions of generally each cavity or turbine assembly orifice. That said, preferred foreign material exclusion devices have a body 40 that is substantially cylindrical or block shaped. Body 40 is dimensioned to provide a resilient snug fit with the above-mentioned orifice which thereby provides a barrier to the entrance of foreign materials. Foreign materials can generally be defined as any object, particle or the like such as, but not limited to, nuts, bolts, metal bits, debris, hand tools, sockets, measuring devices, or any other material not designed to be located in a desired area of a turbine assembly. The thickness of body 40, generally measured in a direction parallel to the longitudinal direction of walls of tube 100 such as shown in FIG. 1, is sufficient to maintain a snug or tight fit about the desired opening. Dimensions can vary widely by application, with the primary goal of foreign object exclusion requiring sufficient strength to retain the heaviest object used in that portion of the protected device.

Body 40 of the material exclusion device of the present invention is generally formed from a polymer or rubber, and is preferably a foam or foam like material. Foams are cellular materials generally having small hollow spaces which occur during manufacture of the foam. If the cells are fully surrounded by cell walls, the foam is called closed cell foam. In mixed cell foams, the cell walls are partially perforated. In open cell foams, the cells have gas phase connections to each other. Any of the above-mentioned foam types can be utilized in the present invention so long as the foams can be resiliently compressed and prevent the foreign material from entering a predetermined area of the turbine. Generally, open cell foams are preferred as they are more flexible and elastomeric when compared to closed cell foams which tend to be compression resistant.

Suitable polymer compositions which can be foamed to form the body of the present invention include polyethylene, e.g. low density polyethylene and high density polyethylene (HDPE), polypropylene, and copolymers of ethylene or propylene and a monoethylenically unsaturated monomer copolymerizable therewith. Other suitable polyolefins include branched polypropylene homopolymer and branched copolymers of polypropylene. Examples also include copolymers of ethylene and acrylic acid or methyl acrylic acid and $C_1$-$C_4$ alkyl esters or ionomeric derivatives thereof; ethylene vinyl-acetate copolymers; ethylene/carbon monoxide copolymers; anhydride containing olefin copolymers of a diene; copolymers of ethylene and an alpha-olefin having ultra low molecular weight (i.e., densities less than 0.92 g/cc); blends of all of the above resins; blends thereof with polyethylene (high, intermediate or low density), etc.

Other suitable polymeric compositions which may be used in the practice of the invention include, but are not limited to, polyesters, polyamides, polyimides, polyvinylchloride, polyvinylidene chloride, polycarbonates, polyurethanes, and polystyrene resins.

Rubbers include silicones and copolymers of ethylene and propylene and can be prepared by known addition polymerization techniques, including the use of small amounts of a diene such as butadiene. Additional rubber or elastomeric components include various conjugated dienes having from 4-8 carbon atoms such as isobutylene, butadiene, and ethylene/propylene/diene interpolymers may be included in the blend if desired. Rubbers include the aromatic containing rubbers such as styrene, butadiene rubber and the like. Moreover, additional components such as crosslinking agents designed to provide latent crosslinking of the ethylenic or propylenic polymer, such as silane functional crosslinking agents, or covalent or ionic crosslinking agents, may be included if desired.

The thermoplastic polymer material or blend is melt processed in a conventional manner by feeding, melting, and metering into a conventional melt processing apparatus such as an extruder. A volatile blowing agent and an optional crosslinking agent are mixed with the polyolefin polymer or blend under a pressure suitable to form a flowable gel or admixture. A crosslinking agent may be added in an amount which is sufficient to initiate crosslinking and raise the pressure of the mixture to less than that pressure which causes melt fracture of the polymer to occur. The term "melt fracture" is used in the art to describe a melt flow instability of a polymer as it is extruded through a die, which flow instability causes voids and/or other irregularities in the final product. Any other known methods for producing foam compositions can also be utilized to form the foam utilized in the present invention.

The foam blends are generally prepared by heating the desired polymer or rubber to form a plasticized or melt polymer material, incorporating therein a blowing agent to form a foamable gel, and extruding the gel through a die to form the foam product. Prior to mixing with the blowing agent, the resin or blend is heated to a temperature at or above its glass transition temperature or melting point. The blowing agent may be incorporated or mixed into the melt polymer material by any means known in the art, such as with an extruder, mixture, blender, or the like. The blowing agent is mixed with the melt polymer material at an elevated pressure sufficient to prevent substantial expansion of the melt polymer material and to generally disperse the blowing agent homogeneously therein. Optionally, a nucleating agent may be blended in the polymer melt or dry blended with the polymer material prior to plasticizing or melting. The foamable gel or melt is typically cooled to a lower temperature to optimize physical characteristics of the foam structure. The gel may be cooled in the extruder or other mixing device or in separate coolers. The gel is then extruded or conveyed through a die of desired shape to a zone of reduced or lower pressure to form the foam product. The zone of lower pressure is at a pressure lower than that in which the foamable gel is maintained prior to extrusion through the die. The lower pressure may be super-atmospheric or sub-atmospheric (vacuum), but is preferably at an atmospherical level.

The polymer or rubber foam may be open or closed-celled, as desired. The percentage of open cells can be controlled, as is well known in the art, by appropriate selection of blowing agents, additives, polymers, and processing parameters, such as temperatures, pressures, and extrusion rates. A preferred foam of the present invention is polyester and is available from sources including Orbis Manufacturing of Mentor, Ohio.

While the density of the foam can vary, the foams of the present invention are generally considered lightweight and range generally from about 1 to about 200 or 300 kg/$m^3$, desirably from about 5 to about 150 kg/$m^3$, and preferably from about 10 to 20 to about 50, about 75, or about 100 kg/$m^3$.

It is also possible to add various additives such as inorganic fillers, pigments, anti-oxidants, acid scavengers, ultraviolet absorbers, flame retardants, surfactants, processing aids, extrusion aids and the like is suitable as known to those of ordinary skill in the art.

Other additives include inorganic substances such as calcium carbonate, talc, clay, titanium oxide, silica, barium sulfate, diatomaceous earth and the like, carbon dioxide generated by the combination of a bicarbonate or a carbonate of sodium, potassium, ammonium or the like and an inorganic or organic acid such as boric acid, citric acid, tartaric acid or the like, thermal decomposition type chemical foaming agents such as azodicarbonamide, benzenesulfonyl hydrazide, toluene-sulfonyl hydrazide and the like.

The volatile foaming agents usable in this invention generally have a boiling point temperature range of −90° C. to +80° C., and include, but are not limited to, aliphatic hydrocarbons such as n-pentane, isopentane, neopentane, isobutene, n-butane, propane, ethane and the like; fluoro-chlorinated hydrocarbons such as dichlorotetrafluoroethane, trifluoroethane, trichloromonofluoromethane, dichlorodifluoromethane, dichloromonofluoromathane, and the like. Among them, the non-fully halogenated hydrocarbons are preferred because of environmental considerations. Particularly preferred among the non-fully halogenated hydrocarbons are partially or fully fluorinated hydrocarbons and non-fully halogenated fluorochlorinated hydrocarbons. Examples of these include 1-chloro-1,1-fluoroethane, 1,1,1,2-tetrafluoroethane and 1,1-difluoroethane. Particularly preferred among the aliphatic hydrocarbons are isobutene and isobutene/n-butane mixtures. Other blowing agents which may be employed include alcohols such as methanol and ethanol. Also contemplated are inorganic blowing agents such as carbon dioxide, water, nitrogen, argon and combinations thereof, as well as combinations of these inorganic blowing agents with hydrocarbon and/or halogenated hydrocarbon blowing agents. Also decomposable blowing agents, such as azobisformamide, may be incorporated with the volatile foaming agents. Mixtures of any or all of these volatile foaming agents are also contemplated within the scope of the invention. Also contemplated are combinations including water and/or carbon dioxide as the primary blowing agent.

Figure 4:
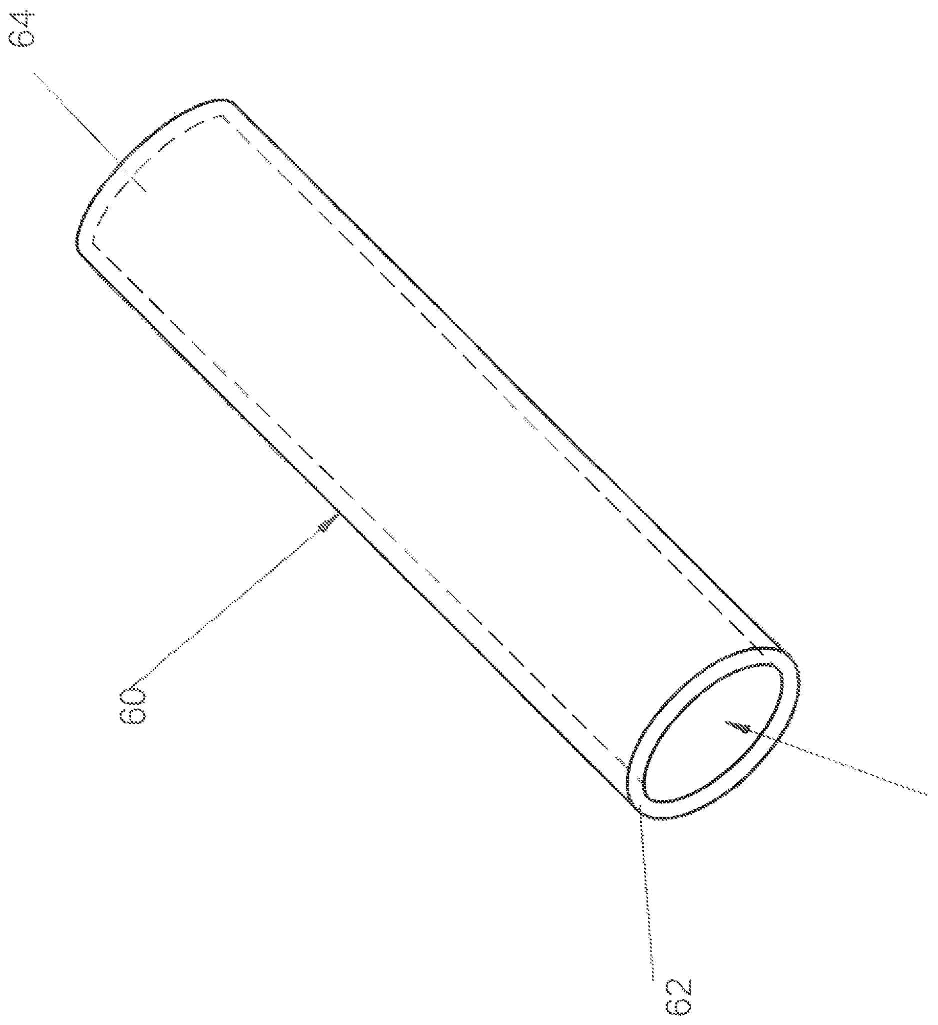
FIG. 4 is a perspective view of one embodiment of an internal support device of the present invention.
Figure 5:
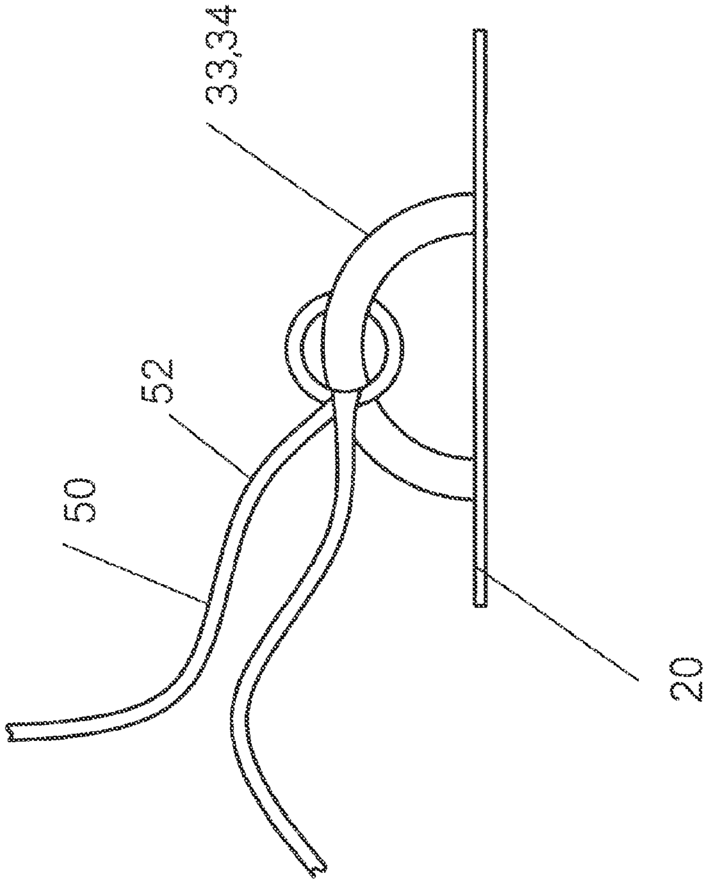
FIG. 5 is a perspective view showing one embodiment of a retrieval aid being connected to a connector segment of an inner surface of an enclosure.

The foreign material exclusion device 10 of the present invention preferably also includes an internal support device 60 as illustrated in FIGS. 2 and 4. The support device 60 aids in maintaining a desired alignment between enclosure 20 and body 40. Support device 60 extends through at least a portion of the body 40 for example between upper surface 42 and lower surface 44. The support device also includes a passageway 66 between first end 62 and 64 through which the retrieval aid 50 can extend. Depending upon the end use of the device 10, the support device 60 can have the length that is longer or shorter than the portion of the body 40 through which the support device 60 extends. In one embodiment the support device is fabricated from a polymeric material.

As indicated hereinabove, the foreign material exclusion device 10 includes a retrieval aid 50 in various embodiments. The retrieval aids in positioning of the device in a construction and also removal thereof after a desired operation has been performed on the construction. As illustrated in FIG. 2, a first end 52 of retrieval aid 50 is connected to enclosure 20, in particular a connector segment 33 which is in the form of loop 34 and FIG. 2. The retrieval aid 50 is generally in the form of a line, cord, cable or the like As illustrated in FIG. 1, in some embodiments a closure element 70 is operatively connected to and is therefore a part of device 10. Closure element 70 in one embodiment is in the form of a washer through which a portion of the retrieval aid 50 can extend, such as illustrated. In the embodiment illustrated in FIG. 1, the retrieval aid is knotted adjacent the closure element to maintain the device in a closed position. In other embodiments, securing devices such as a line or cord stop, for example a push-button operated stop can be utilized in place in knot 56. One important feature of closure element 70 is that the same can be utilized to provide identification information or other indicia in order to track device usage, construction or other information.

In yet a further embodiment is to be understood that the device can be provided with a tracking system for example as described in U.S. Pat. No. 7,533,698, herein fully incorporated by reference.

In accordance with the patent statutes, the best mode and preferred embodiment have been set forth; the scope of the invention is not limited thereto, but rather by the scope of the attached claims.

What is claimed is:

1. A foreign material exclusion device, comprising:

a body, comprising a resilient material comprising one or more of a polymer foam and a rubber foam, wherein the body has an uppermost surface, a lowermost surface and a side surface located between the uppermost surface and the lowermost surface;

an enclosure having a plurality of panels connected by sewing or adhering, the enclosure having at least two flaps that can be operatively connected to each other by a fastener assembly to enclose the body within the enclosure, wherein the enclosure is substantially conformable to the shape of the body, wherein the enclosure comprises fabric material made from fibers, wherein the body uppermost surface, the body lowermost surface and the body side surface are each in direct contact with an inner surface of the enclosure, wherein the enclosure generally conforms to the dimensions of the body; and a retrieval aid, directly connected to the enclosure, and wherein the body is resilient in nature so that it is adapted to be compressed to fit into a desired opening, and yet re-expand to provide a snug fit within or about the opening, wherein the enclosure includes a connector segment connected to an interior surface thereof, and wherein the retrieval aid is connected to the connector segment, wherein the device further includes an internal support device that is located within the enclosure and extends between an upper surface and a lower surface of the body, and wherein the retrieval aid extends through a passageway in the internal support device.

2. The device according to claim 1, wherein at least one flap includes a flap aperture, extending through a surface of the flap, through which a portion of the retrieval aid extends.

3. The device according to claim 1, wherein three or more flaps are present, each including a separate aperture through which a portion of the retrieval aid extends.

4. The device according to claim 3, wherein the connector segment is in the form of a loop that is connected on a lower, interior surface of the enclosure.

5. A foreign material exclusion device, comprising:

a body, comprising a resilient material comprising one or more of a polymer foam and a rubber foam, wherein the body has an uppermost surface, a lowermost surface and a side surface located between the uppermost surface and the lowermost surface;

an enclosure conformable to a shape of the body, wherein the enclosure encases the body and prevents the body from being separated from the device, wherein the enclosure comprises fabric material made from fibers, wherein the body uppermost surface, the body lowermost surface and the body side surface are each in direct contact with an inner surface of enclosure, wherein the enclosure generally conforms to the dimensions of the body; and a retrieval aid removably and directly connected to an interior surface of the enclosure and extending through a portion of the body and out of the enclosure through an enclosure aperture, and wherein the retrieval aid is a line, cord or cable, and wherein the body is resilient in nature so that it is adapted to be compressed to fit into a desired opening, and yet re-expand to provide a snug fit within or about the opening, wherein the retrieval aid extends through the body between a lower surface and an upper surface of the body.

6. The device according to claim 5, wherein the enclosure has an upper surface including a flap having a flap aperture extending through a surface of the flap, and wherein a portion of the retrieval aid extends through the flap aperture and out of the enclosure.

7. The device according to claim 6, wherein a plurality of flaps are present, wherein a first flap is connected to a second flap via a fastener assembly.

8. The device according to claim 5, wherein the enclosure has a connector segment on a lower interior surface thereof and the retrieval aid is connected to the connector segment.

9. The device according to claim 8, wherein three or more flaps are provided on the upper surface of the enclosure that can be folded such that at least one flap overlaps a second flap in order to encase the body within the enclosure.

10. A foreign material exclusion device, comprising:

a body, comprising a resilient material comprising one or more of a polymer foam and a rubber foam, wherein the body has an uppermost surface, a lowermost surface and a side surface located between the uppermost surface and the lowermost surface;

an enclosure that encases the body within the enclosure, wherein the enclosure comprises fabric material made from fibers, wherein the body uppermost surface, the body lowermost surface and the body side surface are each in direct contact with an inner surface of enclosure, wherein the enclosure generally conforms to the dimensions of the body;

an internal support device that is a component distinct from the enclosure, and located completely within the enclosure that extends through at least a portion of the body; and a retrieval aid that is distinct from the enclosure and the internal support device and removably and directly connected to an interior portion of the enclosure and extending through the internal support device and out of the enclosure, and wherein the retrieval aid is a line, cord or cable, and wherein the body is resilient in nature so that it is adapted to be compressed to fit into a desired opening, and yet re-expand to provide a snug fit within or about the opening.

11. The device according to claim 10, wherein the enclosure has an upper surface including a flap having a flap aperture, and wherein a portion of the retrieval aid extends through the flap aperture and out of the enclosure.

12. The device according to claim 11, wherein a plurality of flaps are present, wherein a first flap is connected to a second flap via a fastener assembly.

13. The device according to claim 12, wherein three or more flaps are provided on the upper surface of the enclosure that can be folded such that at least one flap overlaps a second flap in order to encase the body within the enclosure.

14. The device according to claim 10, wherein the retrieval aid extends through the body between a lower surface and an upper surface of the body.

15. The device according to claim 14, wherein the enclosure has a connector segment on a lower interior surface thereof and the retrieval aid is connected to the connector segment.

* * * * *